United States Patent
Schindler

(10) Patent No.: US 6,517,288 B2
(45) Date of Patent: Feb. 11, 2003

(54) DIRECT OXYGEN INJECTION GROUNDWATER REMEDIATION METHOD AND SYSTEM

(75) Inventor: A. Russell Schindler, Traverse City, MI (US)

(73) Assignee: Remediation Technologies, Inc., Traverse City, MI (US)

( * ) Notice: Subject to any disclaimer, the term of this patent is extended or adjusted under 35 U.S.C. 154(b) by 0 days.

(21) Appl. No.: 09/903,477

(22) Filed: Jul. 11, 2001

(65) Prior Publication Data

US 2002/0187007 A1 Dec. 12, 2002

Related U.S. Application Data

(60) Provisional application No. 60/296,540, filed on Jun. 6, 2001, and provisional application No. 60/296,528, filed on Jun. 6, 2001.

(51) Int. Cl.⁷ .................................................. B09C 1/10
(52) U.S. Cl. ........................ 405/128.5; 405/128.45; 405/128.7; 405/128.75; 210/610; 210/758; 210/764; 175/67
(58) Field of Search ................... 465/128.45, 128.5, 465/128.7, 128.75; 210/758, 764, 610; 175/67

(56) References Cited

U.S. PATENT DOCUMENTS

| | | | | |
|---|---|---|---|---|
| 4,588,506 A | * | 5/1986 | Raymond et al. | 166/246 |
| 4,936,031 A | * | 6/1990 | Briggs et al. | 37/189 |
| 5,286,141 A | | 2/1994 | Vigneri | |
| 5,361,855 A | * | 11/1994 | Schuermann et al. | 175/215 |
| 5,384,048 A | * | 1/1995 | Hazen et al. | 210/605 |
| 5,472,294 A | * | 12/1995 | Billings et al. | 166/246 |
| 5,623,992 A | * | 4/1997 | Shaw | 166/250.01 |
| 5,690,173 A | * | 11/1997 | Abdul et al. | 166/268 |
| 5,753,494 A | * | 5/1998 | Hater et al. | 405/128.5 |
| 5,766,490 A | * | 6/1998 | Taylor et al. | 210/620 |
| 5,874,001 A | * | 2/1999 | Carter | 210/610 |
| 5,879,107 A | * | 3/1999 | Kiest et al. | 210/611 |
| 5,885,203 A | | 3/1999 | Pelletier | |
| 5,893,975 A | * | 4/1999 | Eifert | 210/150 |
| 6,019,548 A | * | 2/2000 | Hoag et al. | 210/747 |
| 6,100,382 A | | 8/2000 | Wolfe et al. | |
| 6,102,621 A | * | 8/2000 | Siegrist et al. | 405/128.7 |
| 6,109,358 A | * | 8/2000 | McPhee et al. | 166/370 |

(List continued on next page.)

OTHER PUBLICATIONS

E–DOT Systems Enhanced Direct Oxygen Technology Systems: Home Page, Pictures, Case Study and "Example of Typical Enhanced Dissolved Oxygen Technology System installed using the Air Jet technique" and View Map, initialized commercially Jan. 1, 1999; 8 pages from www.complianceinc.com/doit.*

(List continued on next page.)

Primary Examiner—J. J. Swann
Assistant Examiner—Katherine Mitchell
(74) Attorney, Agent, or Firm—Artz & Artz, P.C.

(57) ABSTRACT

A bioremediation method and system for destroying of reducing the level of contaminants in a contaminated subterranean body of water includes a plurality of spaced injection sites. The injection sites extend below ground and intersect a body of groundwater. Each of the plurality of injection sites are in communication with a supply of concentrated oxygen. The oxygen is conveyed by a delivery mechanism from the supply of oxygen to the injection points to naturally reduce the contaminants in the groundwater.

13 Claims, 2 Drawing Sheets

U.S. PATENT DOCUMENTS

| | | | |
|---|---|---|---|
| 6,155,276 | A | 8/2000 | Oglesby et al. |
| 6,121,040 | A * | 9/2000 | Sakuranaga et al. ........ 166/246 |
| 6,207,073 | B1 | 3/2001 | Wolfe et al. |
| 6,254,785 | B1 | 7/2001 | Phifer et al. |
| 6,262,002 | B1 | 7/2001 | Carey |
| 6,319,882 | B1 | 11/2001 | Ivey |
| 2002/0046972 | A1 * | 4/2002 | Newman .................... 210/601 |

OTHER PUBLICATIONS

"New Technologies Enhance Natural Bioremediation Reducing Costs and Accelerating Closure", from www.envirologic.com/orcvsdoi.html, Aug. 1998, 2 pages.*

"Inside view of an 80 SCFM oxygen injection trailer" on p. 2 of 3 pages, www.matrixbiotech.com/html/o2injection.html.*

"Case Study of Oxygen Injection at a Bedrock Site Impacted with BTEX/MTBE", Nov. 14, 2000, www.matrixbiotech.com.*

"Oxygen Injection: A Promising Approach for MTBE Biodegradation" by Sean R. Carter, Jul., 1998, on the www.matrixbiotech.com website.* www.geoprobe.com website—"what is Geoprobe"—3 pages; Drilling service link, 2 pages, UST/AST link, 2 pages; links are to www.envirologic.com.*

* cited by examiner

DIRECT OXYGEN INJECTION GROUNDWATER REMEDIATION METHOD AND SYSTEM

CROSS-REFERENCE TO RELATED APPLICATIONS

The present invention claims priority from U.S. Provisional Application No. 60/296,540, entitled "Direct Oxygen Injection Technology Systems", filed Jun. 6, 2001 and U.S. Provisional App. Ser. No. 60/296,528, entitled "Enhanced Dissolved Oxygen Technology Systems", filed Jun. 6, 2001.

TECHNICAL FIELD

The present invention relates generally to a method and system for reducing the level of contaminants in a body of groundwater and more particularly to a bioremediation method and system for groundwater treatment.

BACKGROUND ART

Groundwater contamination, typically arising from petroleum storage tank spills or from intentional or accidental discharge of liquid hydrocarbons or compositions containing same, has become a problem of increasing concern. This type of contamination occurs not only at industrial complexes, but also in suburban neighborhoods, which would appear to be havens from such phenomena. The source of contamination in suburban neighborhoods or areas is very commonly automobile service station sites at which antiquated or abandoned storage tanks have released gasoline, fuel oils, lubricants, and the like into the local groundwater. Other common sources of such noxious materials can include dry cleaning establishments and/or manufacturers or distributors of the tetrachloroethane which is used in the dry cleaning process.

Various remediation techniques have been utilized in the past for the treatment of contaminated groundwater in order to reduce or eliminate the contaminants. One of the most widely used systems is one based on so-called "pump and treat" technology. These systems withdraw the contaminated groundwater and a phase-separated product from a recovery well located in the groundwater and pump it to an above ground treatment facility. Thereafter, various treatment techniques, as are well known, are used to remove contaminants from the displaced groundwater. These "pump and treat" systems are relatively expensive to install and require that the remaining contaminants, which have been separated from the groundwater, be disposed in an environmentally friendly manner. These processes further increase the cost of the techniques.

One example of a known remediation system is disclosed in U.S. Pat. No. 5,286,141. The '141 patent teaches oxidizing the source of groundwater contamination to harmless constituents by locating a plurality of mutually spaced wells into a groundwater region. A treating flow of hydrogen peroxide solution is provided into the groundwater from one or more wells. The treating flow typically contains reaction surface enhancing reagents, which provide increased surfaces at which the reaction between the hydrogen peroxide and the hydrocarbon contaminants may occur. Further, a catalytic agent is also preferably incorporated into the treating solution or as a pre-injection into the groundwater region to promote the desired reaction between the hydrogen peroxide and hydrocarbons.

Recently, there has also been increasing interest in bioremediation technology. However, its use in treating groundwater has been relatively ineffective due to the complexity of the procedures and equipment required, including expensive and complex reactors. Moreover, current bioremediation techniques can cause adverse geochemical reactions and can introduce new toxic compounds into the groundwater. Additionally, current bioremediation systems, still require the use of non-organic catalysts or additives to cause the process to be completed in a reasonable period of time. These catalysts or additives raise other contaminant issues with respect to the groundwater.

It is known that naturally growing bacteria in the groundwater can break down groundwater contaminants. However, these bacteria feed off oxygen and the lack of oxygen is the single biggest limiting factor on the growth of the bacterial population and therefore contaminant decrease. Ambient air, which is comprised of about 21% percent oxygen, only results in approximately 10–12 ppm of dissolved oxygen in the groundwater and thus is not sufficient to adequately destroy or reduce contaminants. Various attempts to increase the amount of oxygen by utilizing oxygen releasing compounds have been tried, but these oxygen releasing compounds, such as magnesium peroxide or calcium peroxide are expensive. Further, these oxygen releasing compounds only produce a small amount of usable oxygen and therefore do not significantly increase the bacterial population.

SUMMARY OF THE INVENTION

It is therefore an object of the present invention to provide a bioremediation method and system for groundwater treatment that is more effective than prior bioremediation systems.

It is another object of the present invention to provide a bioremediation method and system for groundwater treatment that is less expensive than prior bioremediation systems.

It is still another object of the present invention to provide a bioremediation method and system for groundwater treatment that treats contamination naturally and effectively.

It is still another object of the present invention to provide a bioremediation system that is relatively easy and inexpensive to install and operate.

It is a related object of the present invention to provide a bioremediation system that can be installed with minimal site disturbance.

In accordance with the above and other objects of the present invention a bioremediation method and system is provided. The method includes providing a plurality of injection points extending from above ground to a subterranean body of groundwater. Substantially pure oxygen is delivered to the plurality of injection points and into the subterranean body of groundwater until the level of contaminants in the groundwater is reduced or eliminated.

The system includes a plurality of injection points extending below ground such that they intersect a body of groundwater. The plurality of injection points are in communication with a supply of concentrated oxygen. The concentrated oxygen is conveyed to each of the plurality of injection points and into the groundwater. The system includes at least one monitoring well for evaluating the level of contaminants in the groundwater.

The above objects and other objects, features and advantages of the present invention will be apparent from the following detailed description of best made for carrying out the invention to be taken in connection with the accompanying drawings and appended claims.

DETAILED DESCRIPTION OF THE PREFERRED EMBODIMENT

Figure 1:
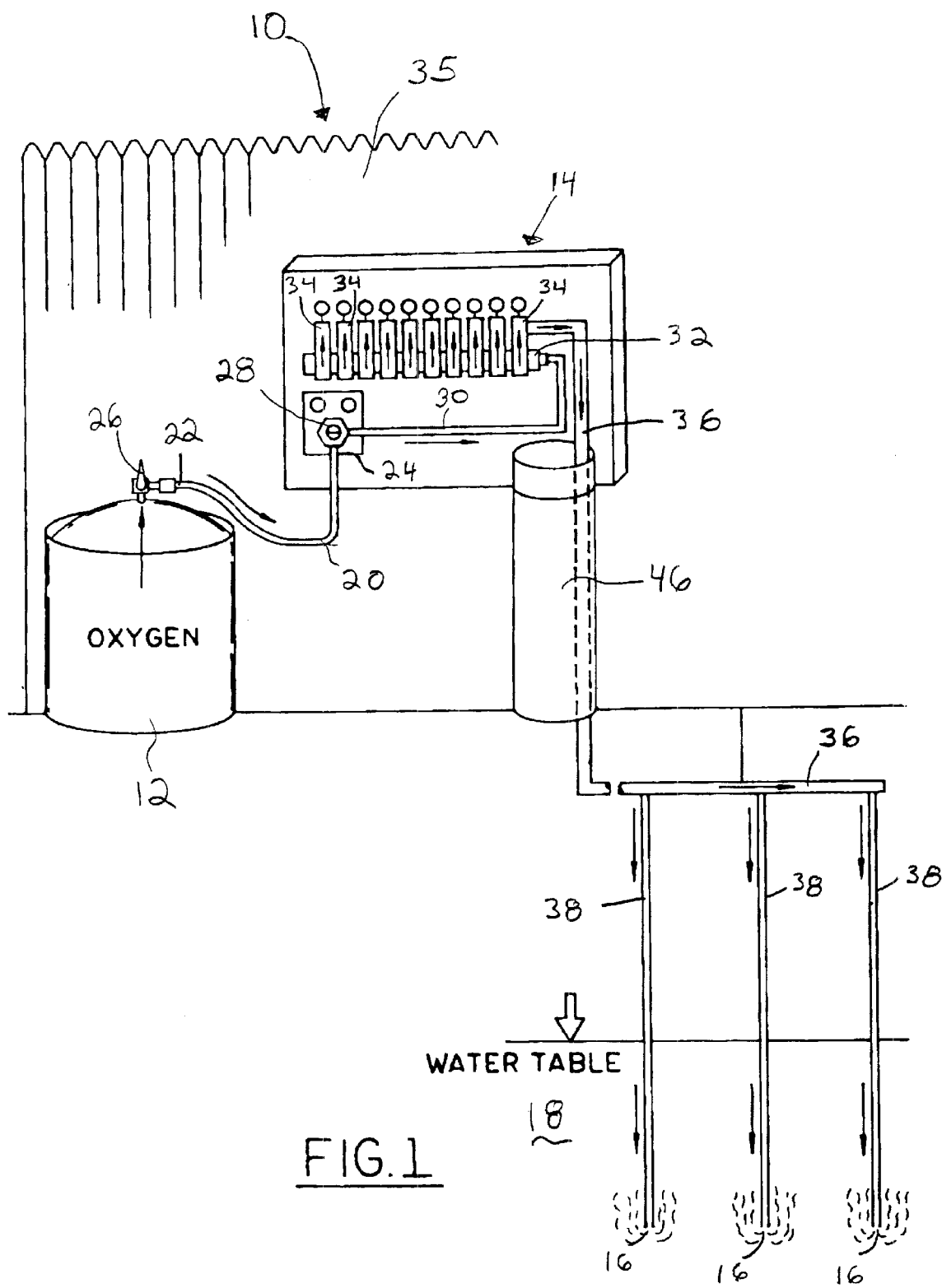
FIG. 1 is a schematic illustration of a direct oxygen injection bioremediation system in accordance with a preferred embodiment of the present invention.

Referring now to FIG. 1 which illustrates a bioremediation system 10 in accordance with the present invention. The preferred bioremediation system 10 is preferably used to clean up biodegradable petroleum constituents that are present in contaminated groundwater. However, it should be understood, that the system 10 can be used to clean up other contaminates or constituents in groundwater and that the system may be used for a variety of other purposes.

The preferred bioremediation system 10 preferably includes a source of oxygen 12, such as a liquid oxygen tank. However, the oxygen can be provided in a variety of other forms. While the source of oxygen is preferably pure, it can also be of sufficient purity to accomplish the objectives of the present invention. For example, a source of oxygen that has over 50% oxygen may also be sufficient. The source of oxygen 12 is preferably in communication with a control panel 14 to regulate the flow of oxygen from the oxygen source 12. The oxygen that flows to the control panel 14 is then conveyed to a plurality of injection sites 16 in a subterranean body of groundwater, generally indicated by reference number 18. The location of the injection sites 16 can be determined in a variety of ways, as discussed below.

The source of oxygen 12 is preferably coupled to the control panel 14 by a pressure hose 20 in order to convey the oxygen thereto. The pressure hose 20 has a first end 22 that is connected to the source of oxygen 12 and a second end 24 that is connected to the control panel 14. The source of oxygen 12 has a shut off valve 26 associated therewith and located between the source of oxygen 12 and the first end 22 of the pressure hose 20. The shut off valve 26 allows the flow of oxygen from the source of oxygen 12 to the pressure hose 20 to be manually closed as desired. It should be understood that the valve can also be electronically controlled. The second end 24 is preferably connected to a pressure regulator 28 which allows the pressure of oxygen exiting the source of oxygen 12 to be controlled. In the preferred embodiment, the pressure regulator 28 is set such that the pressure of oxygen exiting the oxygen source 12 is set for example, at 100 psi. It should be understood that the pressure regulator 28 can be adjusted to regulate the flow of oxygen to a variety of different pressures.

The oxygen that exits the pressure regulator 28 enters a first conduit 30, which conveys the pressure regulated oxygen to an oxygen header pipe 32. The oxygen header pipe 32 has a plurality of flow meters 34 connected thereto and in fluid communication therewith. The pressure regulator 28, the first conduit 30, the oxygen header pipe 32 and the plurality of flow meters 34 are all preferably disposed within the control panel 14 and the control panel 14 is preferably mounted to a fence, wall or other structure 35. However, more or less items may be included in the control panel 14.

The flow meters 34 regulate the flow of oxygen from the header pipe 32 to a respective outlet tube 36. Each outlet tube 36 is in communication with an injection tube 38 that terminates at a respective one of the plurality of injection sites or points 16. Accordingly, the number of flow meters 34 that are utilized in a particular system will depend upon the number of injection sites that are determined to be necessary to clean up the groundwater at a given location. The conduits, pipes, tubes, and injection points are preferably constructed of PVC piping. The outlet tube 36 is preferably ¼ inch tubing and the injection tubes 38 are preferably ½ inch tubing. The size and material of the pipes and tubes can obviously vary.

Figure 2:
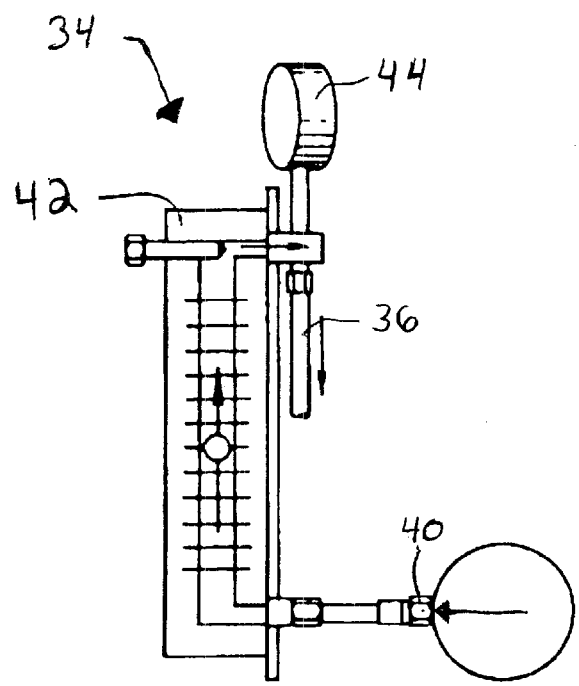
FIG. 2 is an illustration of a flow meter of the system of FIG. 1 in accordance with a preferred embodiment of the present invention.

As shown in more detail in FIG. 2, each flow meter 34 is preferably connected to the oxygen header pipe 32 by a compression fitting 40 that allows oxygen at the regulated pressure to be delivered thereto. Each flow meter 32 is preferably mounted to a mounting board 42 or other structure in the control panel 14 and includes a pressure indicator 44 that provides a visual indication of the pressure of fluid flowing therethrough. The outlet tubes 36 that are in communication with the outlet of the flow meters 34 preferably extend through a protective conduit 46 (FIG. 1) which extends from the control panel 14 into the ground. The protective conduit 46 acts to shield and protect the outlet tubing 36. The outlet tubing 36 is preferably located at least one foot below the ground and runs generally parallel thereto. The injection tubing 38 in communication with the outlet tubing 36 extends generally perpendicularly downward from the outlet tubing 36. As shown, the outlet tubing 36 intersects the groundwater 18 below the water table at designated injection sites 16 in order to deliver the pure oxygen thereto.

It has been determined that pure oxygen works to clean up contaminants in a body of groundwater more efficiently than ambient air and more efficiently and at less cost than various oxygen releasing compounds. By increasing the amount of dissolved oxygen, it has been found that the bacterial population increases by over a magnitude of a thousand. The issue thus becomes how to deliver the pure oxygen into the ground and into communication with the groundwater. In accordance with the present invention, the preferred way is through the delivery system described above. Moreover, other delivery systems for conveying the oxygen to the injection sites may also be utilized.

However, in the preferred embodiment, a plurality of injection tubes 38 are utilized to convey the pure oxygen from the source 12 to the injection sites 16. While the source of oxygen 12 is preferably initially in liquid form, the pressure in the source 12 causes the liquid to turn to vapor. It is the pure oxygen vapor that is captured and then delivered through the delivery system. The injection points 16 and the injection tubes 38 can be installed by any of a variety of methods, including typical hollow stem auger with sand backfill. This is primarily for sites interbedded with clays and sites. Alternatively, the injection tubes 38 may be installed by known GeoProbe® (GeoProbe is a registered trademark of KEJR Engineering, Inc. of Kansas) installation techniques.

Preferably, the injection tubes 38 are installed by airjet injection. Airjet injection is a novel installation technique that is part of the present invention. In accordance with the present invention, airjet injection utilizes a compressor that is connected to an injection tube 38 via a hose. The air flow and pressure from the compressor act as a cutting tool and the injection tube 38 can be "injected" or inserted into the ground with minimal site description and minimal time and capital expense. It has been determined that up to eighty (80) or more injection points can be installed in a single day. This is significantly higher than the number of points that could be installed under prior installation methods.

Figure 3:
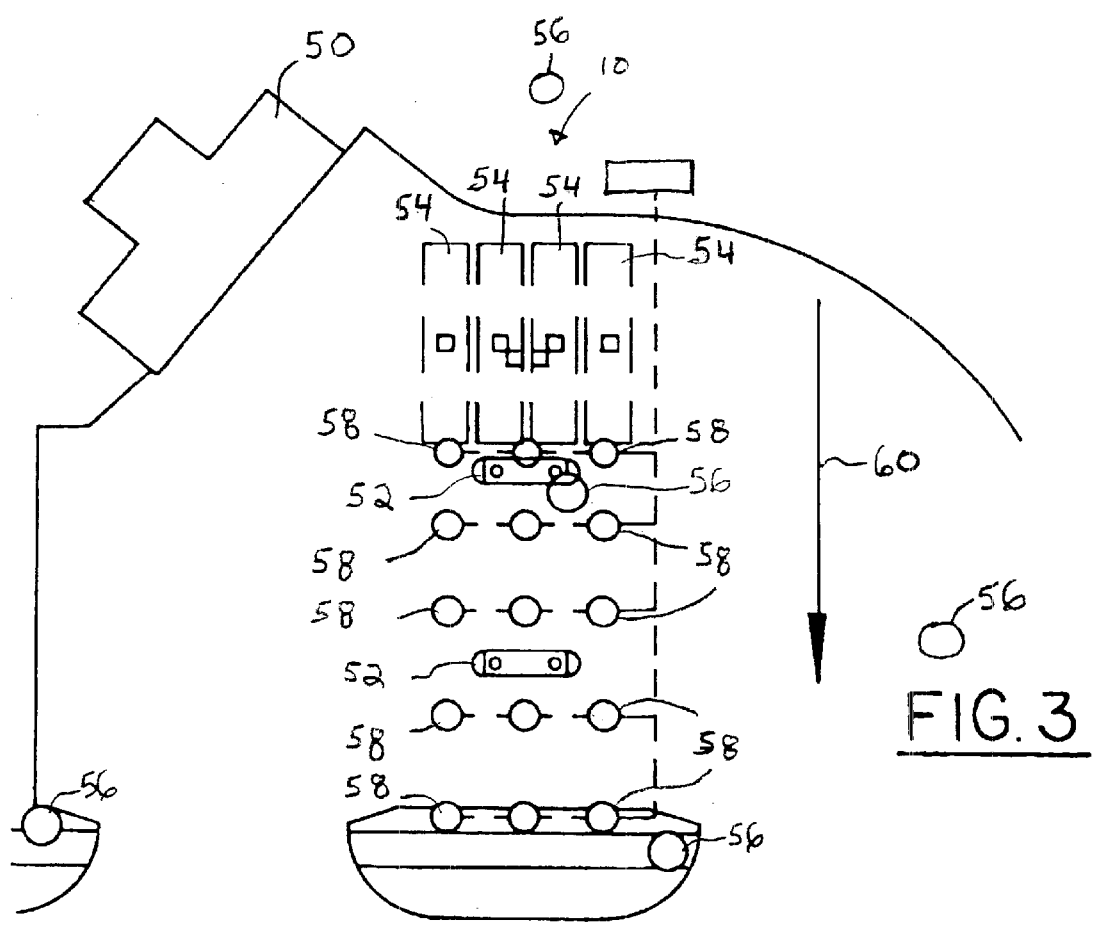
FIG. 3 is a schematic illustration of an exemplary direct oxygen injection bioremediation system installation in accordance with a preferred embodiment of the present invention.

Referring now to FIG. 3 which illustrates an exemplary installation of the system 10 in accordance with the present invention. The system shown in FIG. 3 is preferably installed at a site that was formerly a service station and has been determined to have groundwater that is contaminated with petroleum, whether through accidental or intentional spillage. As is known, the groundwater can be tested through the use of a monitoring well to determine whether or not the groundwater has been contaminated. In accordance with the present invention, one way for determining the existence of contaminants is the absence or depletion of oxygen which indicates that naturally existing bacteria are feeding on the oxygen in an effort to breakdown the contaminants. It can be assumed that a body of groundwater has unacceptable levels of contamination when the percentage of oxygen in and around the groundwater is in the order of 0%–1%.

Once it has been determined that the groundwater is contaminated, in accordance with the present invention, the location of the injection points can be determined. The location of the injection points can be determined in a variety of different methods. Preferably, however, the injection points are located in a grid that takes into account the direction and flow rate of groundwater flow. By taking into account the groundwater flow, injection sites will be positioned to prevent contaminants from spreading. Typical grid determination is based on site specifics, but generally, a grid is based on two months of groundwater flow (e.g. if the groundwater flows 120 feet per year, the grid would be a 20 foot grid).

Accordingly, as shown in FIG. 3, the exemplary system 10 is installed at a gas station 50 having a plurality of dispenser islands 52. The dispenser islands 52 were provided with petroleum from a plurality of storage tanks 54. A plurality of monitoring wells 56 are utilized to determine the extent and location of any contaminants so that the system usage can be maximized. In FIG. 3, five (5) monitoring wells 56 are illustrated. Obviously, any number of wells can be created. The injection sites 16 are preferably located in a grid pattern as shown (i.e. columns and rows), and then the injection tubes 38, which are connected to the source of liquid oxygen 12 and the control panel 14 are installed to inject pure oxygen into the groundwater at the injection sites 16. The arrow 60 designates the direction of groundwater flow.

Once the system is installed, the oxygen vapor will be regulated and metered to be delivered into the groundwater at a predetermined rate. The rate is preferably adjusted over time. The dissolved oxygen in the groundwater and the amount of oxygen in the soil gas are monitored to assure a sufficient flow of oxygen to the injection sites 16. Similarly, the oxygen is monitored to determine if too much oxygen is being added in order to prevent undue waste. Obviously, the rate and pressure of the oxygen vapor can be varied as needed. The effect of the system on the contaminants can be monitored periodically through the monitoring wells. Further, if the source of oxygen 12 becomes depleted, it can be easily replaced without disrupting the clean up process.

The preferred system is relatively inexpensive to install as it costs significantly less than prior systems. Moreover, the system operates twenty-four hours a day and requires no electricity or maintenance to operate. Further, as there are no moving parts, there is nothing to lube, oil or grease. The system is also less susceptible to break down.

While particular embodiments of the invention have been shown and described, numerous variations and alternate embodiments will occur to those skilled in the art. Accordingly, it is intended that the invention be limited only in terms of the appended claims.

What is claimed is:

1. A method for remediating a contaminated region of a subterranean body of groundwater to destroy or reduce the initial concentration levels of contaminants, comprising:

providing at least one injection point extending from above ground to the subterranean body of groundwater;

providing a supply of substantially pure liquid oxygen;

converting said liquid oxygen to vapor oxygen;

conveying said substantially pure oxygen vapor to a regulating mechanism;

delivering said substantially pure oxygen vapor through said regulating mechanism to said at least one injection point and into the subterranean body of groundwater until the level of contaminants in the groundwater is reduced or eliminated;

whereby pressurization of said supply of liquid oxygen and delivery thereof does not require electricity or any mechanical parts such that the method can operate continuously.

2. The method of claim 1, further comprising:

providing a plurality of injection points extending from above ground to the subterranean body of groundwater.

3. The method of claim 2, further comprising:

placing said supply of liquid oxygen in communication with each said plurality of injection points.

4. The method of claim 3, further comprising:

regulating the flow of oxygen from said supply of oxygen to said plurality of injection points.

5. The method of claim 2, wherein said plurality of injection points are arranged in a grid pattern.

6. The method of claim 1, further comprising:

installing said at least one injection point through airjet installation techniques.

7. A system for naturally remediating a contaminated subterranean body of groundwater to destroy or reduce the levels of contaminants, comprising:

a plurality of injection points extending below ground to intersect the body of groundwater;

a supply of concentrated liquid oxygen in communication with each of said plurality of injection sites;

a mechanism for conveying said concentrated oxygen in vapor form to each of said plurality of injection points;

at least one monitoring well for evaluating the level of contaminants;

whereby contaminants in the groundwater are destroyed in a naturally occurring manner; and whereby the system can operate twenty-four hours a day and requires no electricity or moving parts to operate.

8. The system of claim 7 further comprising:

a control panel interposed between said supply of concentrated oxygen and said mechanism for conveying said concentrated oxygen to each of said plurality of injection points to regulate the flow of oxygen.

9. The system of claim 8, wherein said control panel includes a plurality of flow meters for regulating the flow rate of oxygen to said plurality of injection points.

10. The system of claim 7, wherein said mechanism includes a plurality of plastic tubes for conveying said concentrated oxygen to said plurality of injection points.

11. A method for remediating contaminated groundwater, comprising:

providing a supply of liquid oxygen in a holding container;

allowing liquid oxygen to convert to vapor oxygen due to natural pressurization in said holding container;

removing oxygen vapor from said supply of liquid oxygen;

conveying said oxygen vapor to a pressure regulator;

injecting said pressurized oxygen vapor into the groundwater; and whereby the contaminated groundwater can be remediated continuously without the need for electricity or moving parts.

12. The method of claim 1, further comprising:

regulating the flow rate of said pressurized oxygen vapor injected into said groundwater.

13. The method of claim 12, further comprising:

monitoring the levels of oxygen in the groundwater to determine whether the flow rate of oxygen needs adjustment.

* * * * *

UNITED STATES PATENT AND TRADEMARK OFFICE
CERTIFICATE OF CORRECTION

PATENT NO.    : 6,517,288 B2
DATED         : February 11, 2003
INVENTOR(S)   : A. Russell Schindler It is certified that error appears in the above-identified patent and that said Letters Patent is hereby corrected as shown below:

<u>Column 8,</u>
Lines 4-5, should read as follows:
12. The method of claim 11, further comprising:
    regulating the low rate of said pressurized oxygen vapor injected into said groundwater.

Signed and Sealed this

Sixteenth Day of December, 2003

JAMES E. ROGAN
*Director of the United States Patent and Trademark Office*